United States Patent
Awarzamani et al.

[11] Patent Number: 6,067,970
[45] Date of Patent: May 30, 2000

[54] FUEL INJECTION DEVICE FOR AN INTERNAL COMBUSTION ENGINE

[75] Inventors: Assadollah Awarzamani, Markgroeningen; Thomas Wilfert, Ludwigsburg; Joerg Heyse, Markgroeningen, all of Germany

[73] Assignee: Robert Bosch GmbH, Stuttgart, Germany

[21] Appl. No.: 08/548,714

[22] Filed: Oct. 26, 1995

[30] Foreign Application Priority Data

Oct. 27, 1994 [DE] Germany ............................... 44 38 335

[51] Int. Cl.[7] ............................................. F02M 31/125
[52] U.S. Cl. ........................................... 123/549; 123/557
[58] Field of Search .................... 123/590, 549, 123/557

[56] References Cited

U.S. PATENT DOCUMENTS

| | | | |
|---|---|---|---|
| 4,922,876 | 5/1990 | Mizoguchi et al. | 123/590 |
| 5,038,742 | 8/1991 | Uddin | 123/549 |
| 5,174,266 | 12/1992 | Evdokimo | 123/557 |

FOREIGN PATENT DOCUMENTS

| | | | |
|---|---|---|---|
| 0453927 | of 0000 | European Pat. Off. | |
| 0456533 | 11/1991 | European Pat. Off. | 123/549 |
| 0477923 | 4/1992 | European Pat. Off. | 123/549 |
| 4121075 | 1/1993 | Germany | 123/549 |

*Primary Examiner*—Erick R. Solis
*Attorney, Agent, or Firm*—Ronald E. Greigg; Edwin E. Greigg

[57] ABSTRACT

A fuel injection device for an internal combustion engine having a fuel injection valve which sprays the fuel in the direction of an inlet valve and includes an electric heating element for the fuel before it reaches an inlet valve. The fuel injection device has a fuel injection valve which sprays the fuel in the form of a fuel jet in the direction of the inlet valve of the internal combustion engine, the fuel jet leaving the fuel injection valve at least in part strikes an electric heating element which, according to the invention, is designed as a Peltier element. The fuel injection device according to the invention is intended, in particular, for mixture-compressing, applied-ignition internal combustion engines.

4 Claims, 3 Drawing Sheets

FUEL INJECTION DEVICE FOR AN INTERNAL COMBUSTION ENGINE

PRIOR ART

The invention starts from a fuel injection device for an internal combustion engine. A fuel injection device has already been disclosed (EP Patent 0,453,927) in which a fuel injection valve is mounted on an intake pipe so as to spray fuel in the direct on of an inlet valve of the internal combustion engine. The fuel leaves the fuel injection valve in the form of a fuel jet which in part strikes a wall of the intake pipe and the inlet valve, condensation of the sprayed fuel occurring when the internal combustion engine is cold or when there are sudden changes in load. Part of the condensed fuel is here deposited in the form of a wall film on the wall of the intake pipe and on the inlet valve and relatively large droplets may separate from the wall film. The separated droplets pass into the combustion space of the internal combustion engine, giving rise there to a locally over-enriched mixture which, due to incomplete combustion, increases the noxious components in the exhaust gas.

In order to reduce these disadvantageous consequences, the fuel jet striking the wall of the intake pipe is heated, for which purpose an electric heating element is provided. The electric heating element is, for example, accommodated flush in the wall of the intake pipe and has a heating surface to heat the fuel jet striking the heating surface to ensure that the fuel jet is in part converted to the vapor state. The fuel partially in the vapor form prevents condensation of the fuel on cold walls or the formation of the wall film. In the prior art indicated, a plurality of electric resistance elements, so-called PTC resistance elements, are used for the purpose of heating and these give off heat to the heating surface when supplied with current due to their electrical resistance. However, PTC resistance elements of this kind have a poor dynamic behavior, making necessary a relatively long awaiting time before a desired surface temperature at the heating surface is established following the switching on of the PTC resistance element. In addition, the PTC resistance elements must be accommodated with good thermal insulation in the installation area in order to keep heat issipation in the installation area as low as possible. To operate, the PTC resistance elements require a high electric power and this can exceed the limited energy reserve of a starter battery particularly during the starting of the internal combustion engine, with the result that there has hitherto been no technical implementation of fuel heating by means of PTC resistance elements.

ADVANTAGES OF THE INVENTION

In contrast, the fuel injection device has the advantage that condensation of the sprayed fuel is avoided in a simple manner, only a low electric power being necessary to enable heating up of the impinging fuel jet, after which the fuel jet at least partially vaporizes. Particularly during a cold start and the sequent warm-up phase and in certain operating ranges of the internal combustion engine, this gives a significant reduction in the noxious components in the exhaust gas. Heating is advantageously performed at high speed, making it possible to achieve a reduction in the noxious components of the exhaust gas right after the starting of the internal combustion engine.

Advantageous further developments and improvements of the fuel injection device are possible by virtue of the measures presented herein.

BRIEF DESCRIPTION OF THE DRAWINGS

Exemplary embodiments of the invention are depicted in simplified form in the drawing and explained in greater detail in the description which follows.

DESCRIPTION OF THE EXEMPLARY EMBODIMENTS

Figure 1:
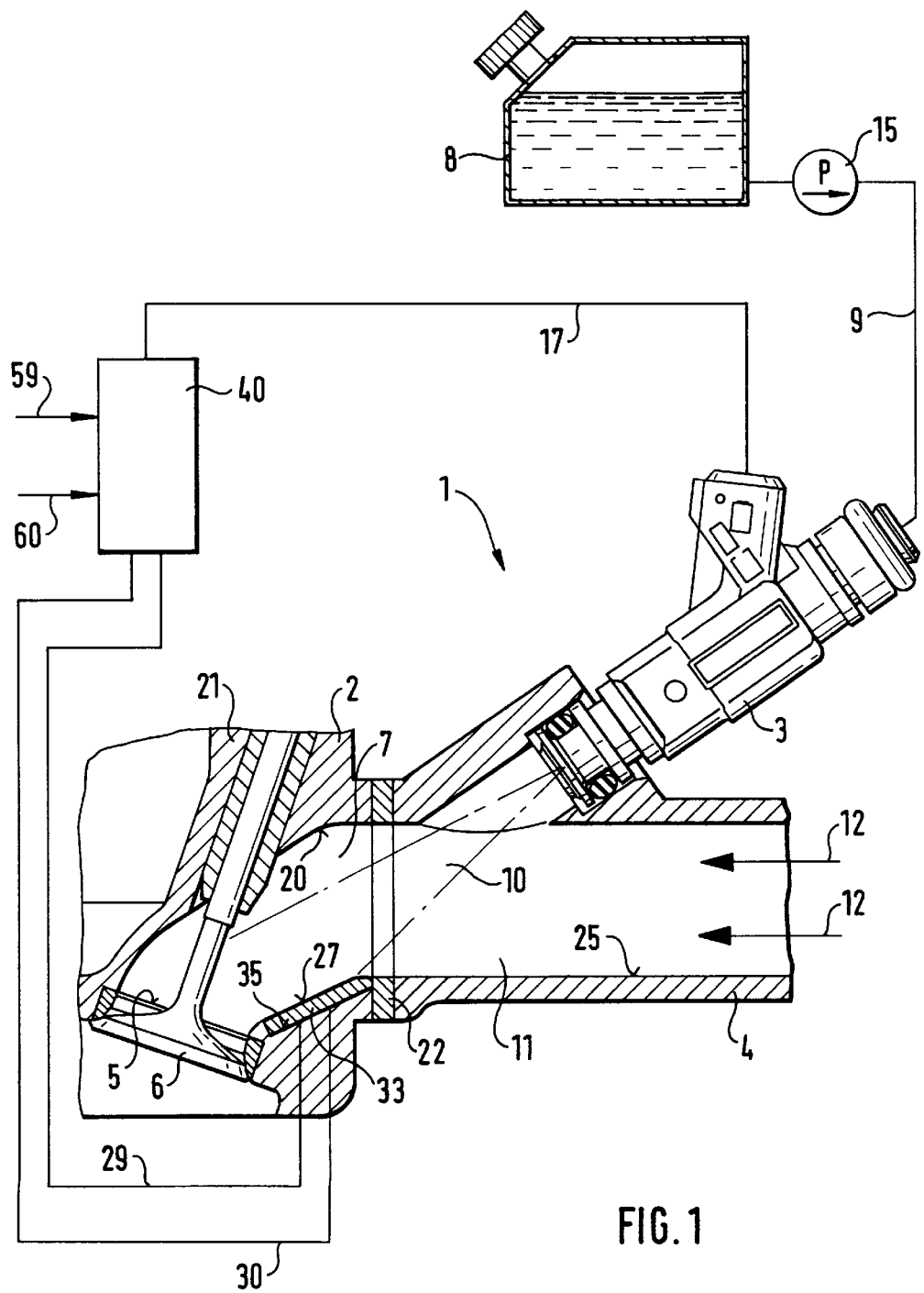
FIG. 1 shows, in a partial sectional representation, a fuel injection device according to the invention in accordance with a first exemplary embodiment.

FIG. 1 shows, in a partial sectional representation, a fuel injection device denoted by 1, which is provided, in particular, for a mixture-compressing, applied-ignition internal combustion engine 2, which is likewise shown in partial sectional representation. The fuel injection device 1 has at least one fuel injection valve 3, which is mounted, by being plugged in for example, on an intake pipe 4 of the internal combustion engine 2. The fuel injection valve 3 is arranged in such a way that it sprays the fuel in the direction of an inlet opening 5 of at least one inlet valve 6 of the internal combustion engine 2. The inlet opening 5 is part of an inlet port 7 which is provided in a cylinder head 21 and leads to the inlet valve 6 as an extension of an intake duct 11 bounded by the intake pipe 4. The intake air drawn in by the internal combustion engine 2 flows along arrows 12 (drawn in) in the intake duct 11 of the intake pipe 4 and in the inlet port 7, from right to left in FIGS. 1, 2 and 4, mixing in the intake duct 11 and especially in the inlet port 7 with the fuel sprayed by the fuel injection valve 3 and, downstream of the inlet opening 5 of the inlet valve 6, burning in the form of a fuel/air mixture in at least one combustion space of the internal combustion engine 2. The quantity of intake air can be controlled in a known manner by a throttling element depicted in FIG. 4, the said throttling element being accommodated rotatably upstream of the fuel injection valve 3 in the intake duct 11 and taking the form, for example, of a throttle butterfly 14. For the supply of fuel, the fuel injection valves 3 are connected, for example via a common fuel distributor (or fuel rail), to a fuel feed pump 15, depicted in FIGS. 1, 2 and 4, which pumps the fuel from the fuel tank 8, via a fuel line 9, to the fuel distributor and, from there, to the individual fuel injection valves 3. In the fuel injection valve 3, the fuel is metered in in a known manner by a valve-closing body, e.g. a valve-closing ball or a valve-closing needle, and a valve seat. The fuel injection valve 3 is, for example, designed to be actuated electromagnetically and can be controlled via an electrical connecting lead 17 by an electronic control unit 40, for example. The electronic control unit 40 is connected to means, sensors for example, which detect operating parameters of the internal combustion engine 2 in order, from an evaluation of the operating parameters, to control, inter alia, the quantity ejected by the fuel injection valve 3, thus, for example, making possible engine power control of the internal combustion engine 2. For this purpose, the electronic control unit 40 is supplied with electrical signals 59 stemming, for example, from a throttle-valve potentiometer which gives information on the position and change in position of the throttle butterfly 14.

The electronic control unit 40 can furthermore be connected to an air mass meter accommodated in the intake duct 11 of the intake pipe 4 of the internal combustion engine 2, said air mass meter supplying the electronic control unit 40 with electrical signals 60 in accordance with the intake air mass flowing in the intake duct 11 of the intake pipe 4.

Figure 2:
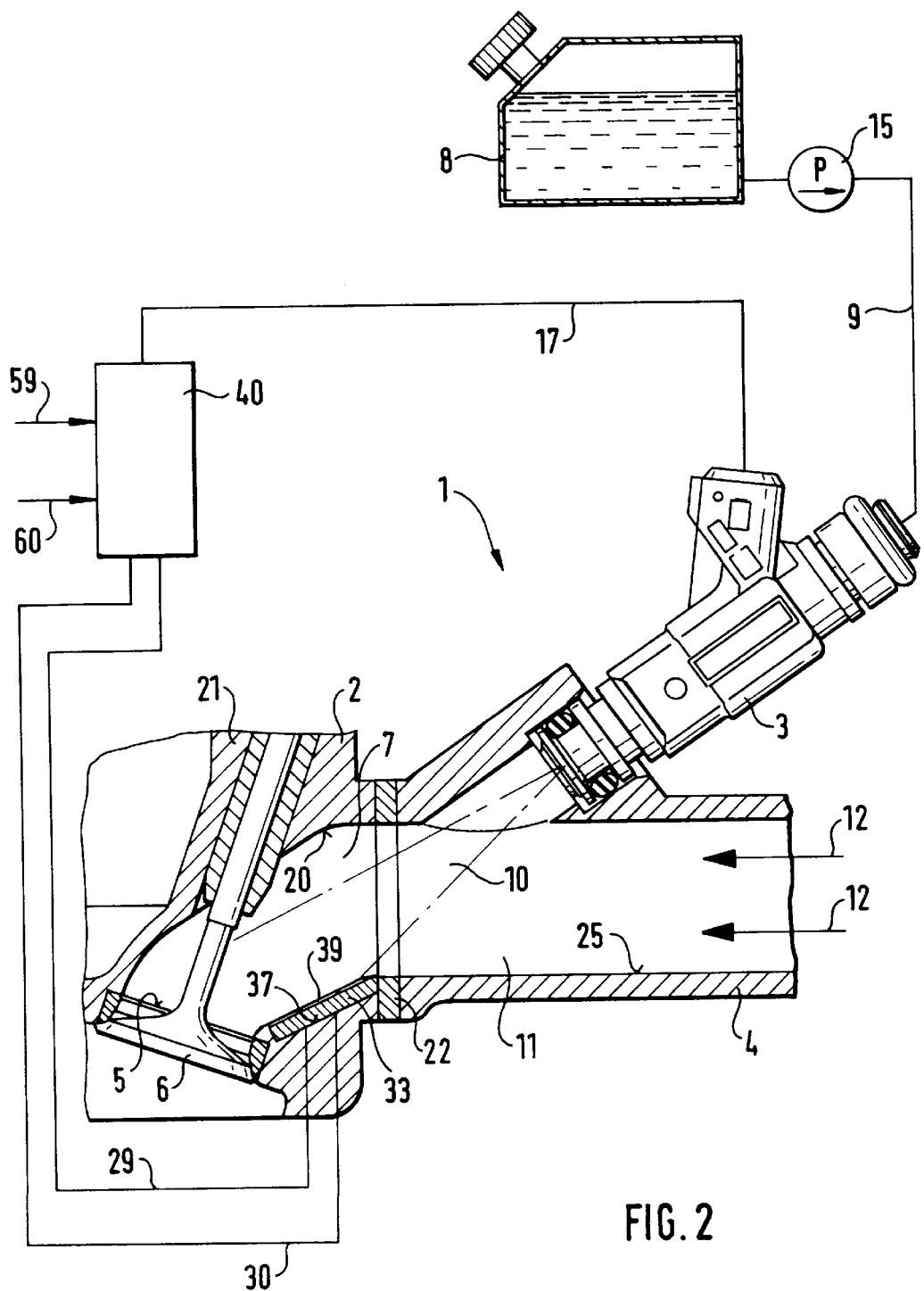
FIG. 2 shows a partial sectional representation of the fuel injection device according to the invention in accordance with a second exemplary embodiment.
Figure 4:
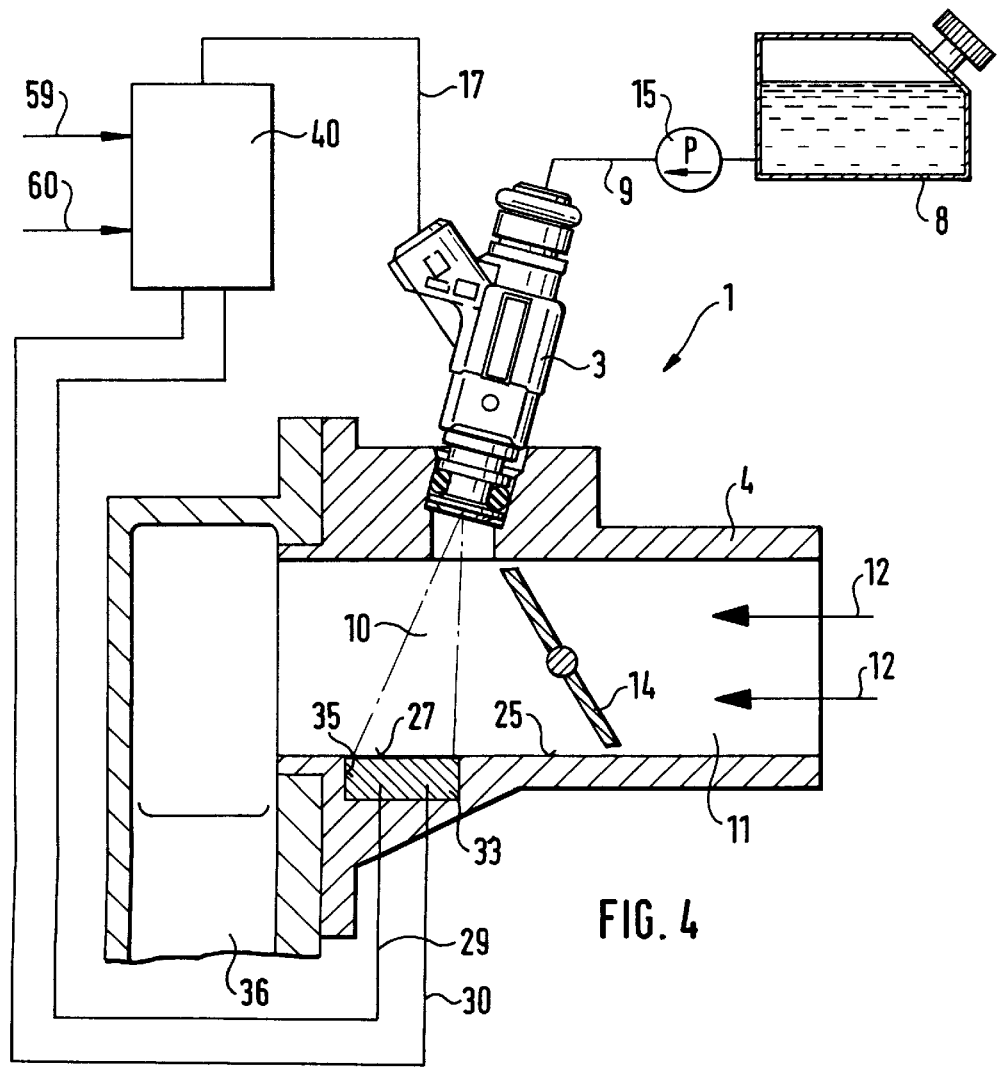

The fuel leaves the fuel injection valve 3 in the form of a concentrated, for example conical or strand-shaped fuel jet 10, the outer boundary of which is indicated in FIGS. 1, 2 and 4 by two lines which have been drawn-in. In the first exemplary embodiment shown in FIG. 1 and in the second exemplary embodiment shown in FIG. 2, part of the fuel jet 10 sprayed by the fuel injection valve 3 strikes an inner wall 20 of the inlet port 7. A sealing ring 22 is provided at the joint between the intake pipe 4 and the inlet port 7 to decouple the intake pipe 4 from the cylinder head 21 (including thermal decoupling).

According to the invention, a Peltier element 33 is provided on the inner wall 20 of the inlet port 7 at least partially struck by the fuel jet 10 in order to heat up the fuel jet 10 by means of the Peltier element 33. The construction and operation of Peltier elements will be explained in greater detail in the text which follows. Peltier elements make use of the effect discovered by the French physicist Jean Peltier and named after him that, when two different metals are joined at two points, a temperature difference arises between the junctions when there is a flow of current in the metals. Depending on the flow of the electric current flowing in the metals, one of the junctions heats up, whereas the other cools down. This effect can also be achieved by means of differently doped semiconductor materials, which are, for example, doped with bismuth or telluride combination in order, by means of the doped semi-conductor materials, to form thermoelectric bridges which have an electron excess (n type) and an electron deficiency (p type). The Peltier element 33 employed in the exemplary embodiments has a multiplicity of such thermoelectric bridges, which are connected electrically in series and accommodated between two thin ceramic plates. If the Peltier element 33 is connected to a source of direct current, a ceramic-coated upper surface 27 of the Peltier element 33 heats up, whereas an opposite, likewise ceramic-coated lower surface 28 cools down in a corresponding manner. In the exemplary embodiments, the cool lower surface 28 of the Peltier element 33 is connected thermally to the inner wall 20 of the cylinder head 21 or to an inner wall 25 of the intake pipe 4. The heatable upper surface 27 of the Peltier element 33 faces the fuel jet 10 of the fuel injection valve 3, i.e. is directed toward the interior of the intake pipe 4 or intake duct 11. The Peltier element 33 operates in a manner corresponding to a heat pump, to which electrical energy is supplied to remove heat from the surroundings and release it again at a higher temperature at another point. Since the heat pump uses the unlimited heat reservoir of the surroundings, good thermal efficiencies can be achieved. Thus only a relatively small amount of electric power is required even during the operation of the Peltier element 33 or to heat the fuel jet 30, this amount being, for example, about 10% of that required by conventional electric heating elements, which employ the heating of an electrical resistor through which current flows.

As shown in FIG. 1, the Peltier element 33 can, for example, be accommodated flush in the inner wall 20 of the cylinder head 21, the upper surface 27 of the Peltier element 33 being arranged approximately in alignment with the inner wall 20 of the cylinder head 21. For this purpose, the inner wall 20 has a recess 35, which is, for example, designed in the form of a groove 35 extending part way in the circumferential direction of the inner wall 20 in order to accommodate the Peltier element 33, which may take the form, for example, of a ring segment, flush in the groove 35. The Peltier element 33 is bonded into the groove 35, for example, after which a protective layer is applied to the upper surface 27 to seal the upper surface 27 for the purpose of protecting the heatable upper surface 27, composed, for example, of ceramic, of the Peltier element 33. The protective layer has a good thermal conductivity and thus does not interfere with the heating of the fuel jet 10. To supply power to the Peltier element 33, two electrical connecting leads 29, 30 are provided, these being passed through the cylinder head 21 from the lower surface 28 of the Peltier element 33 to, for example, the electronic control unit 40.

When the internal combustion engine 2 is started, the Peltier element 33 is supplied with current giving rise to an increase in temperature at the upper surface 27 of, for example, at least 60 kelvin relative to the surroundings, in order in this way at least partially to evaporate the fuel jet 10 of the fuel injection valve 3, part of which strikes the heated upper surface 27 of the Peltier element 33. The heating and supplying of the Peltier element 33 with current is essentially limited to the starting phase and the subsequent warm-up phase of the internal combustion engine 2, for example to the first 100 seconds after starting. Without such heating of the fuel jet 10, condensation of the fuel on cold walls takes place in these phases, on the inner wall 20 of the cylinder head 21, on the inlet valve 6 and on inner walls of the combustion space for example, leading to an increase in the noxious components in the exhaust gas. In addition, the Peltier element 33 can also be supplied with current in operating ranges of the internal combustion engine 2 in which increased exhaust emissions occur only briefly, at full load of the internal combustion engine for example. This can be detected by means of the electronic control unit 40, which supplies the Peltier element 33 briefly with current in order, by means of the heating, to obtain better atomization with partial evaporation of the fuel jet 10, thus making it possible to achieve a significant reduction in the noxious components in the exhaust gas.

As shown in FIG. 2, a partial sectional representation of the fuel injection device 1 according to the invention in accordance with a second exemplary embodiment, it is also possible to introduce the Peltier element 33 into a recess 37 which is made in the cylinder head 21 and extends, for example, from the joint between the intake pipe 4 and the cylinder head 21 toward the inlet valve 6 in the form of a slot. The recess 37 preferably extends in the vicinity of the inner wall 20 of the inlet port 7, parallel to the inner wall 20 for example, and is separated from the inlet port 7 by a thin metal layer 39. The Peltier element 33, which is designed to match the recess 37, can be pushed into the slotshaped recess 37 to the side of the sealing ring 22. The heatable upper surface 27 of the Peltier element 33 is covered in the recess 37 only by the relatively thin metal layer 39 of the inlet port 7, providing good heat conduction from the Peltier element 33 to the inner wall 20 of the inlet port 7 so as to heat up a partial area of the inner wall 20 virtually without delay. By virtue of the thin metal layer 39, covering the Peltier element 33, of the inner wall 20 of the cylinder head 21, it is possible to dispense with the protective layer specified in the first exemplary embodiment in accordance with FIG. 1.

Figure 3:
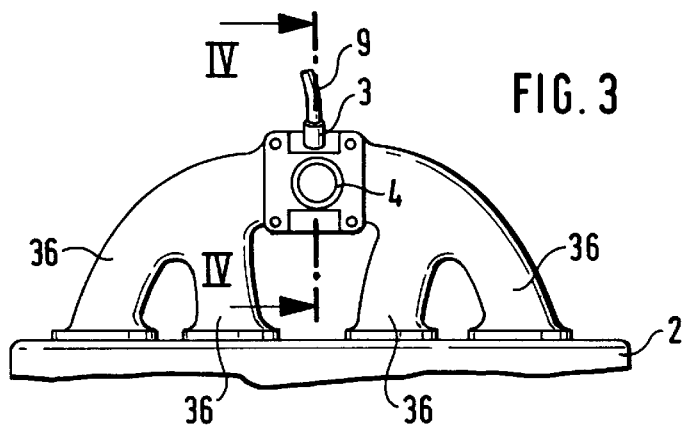
FIG. 3 shows a plan view of the fuel injection device according to the invention in accordance with a third exemplary embodiment and FIG. 4 shows a sectional representation along a line IV—IV in FIG. 3.

FIG. 3 shows a plan view of the fuel injection device 1 according to the invention in accordance with a third exemplary embodiment, in which all parts which are the same or have the same action are denoted by the same reference numerals as in FIGS. 1 and 2. In contrast to the first and second exemplary embodiments, the fuel injection valve 3 in FIG. 3 is arranged at a central point in the intake pipe 4 so as to spray the fuel into the intake pipe 4. In this arrangement, the sprayed fuel mixes with the intake air downstream of the fuel injection valve 3 and reaches the individual combustion spaces of the internal combustion engine 2 in the form of a fuel/air mixture in separately constructed intake-pipe connection pieces 36 of the intake pipe 4. As shown in FIG. 4, a sectional representation along a line IV—IV in FIG. 3, it is also possible to align the fuel jet 10 of the fuel injection valve 3 in such a way that it strikes the upper surface 27 of the Peltier element 33 provided there as completely as possible. This makes possible good heating of the fuel jet 10 with, for example, complete vaporization. As shown in FIG. 4, the Peltier element 33 in accordance with the first exemplary embodiment shown in FIG. 1, is introduced into a groove 35, but this groove is provided in the intake-pipe inner wall 25 of the intake pipe 4.

The shape of the Peltier element 33 is not limited to-the shapes of the embodiments shown in FIGS. 1 to 4. On the contrary, Peltier elements 33 of different shapes can be used when required. In addition to the cylindrical or plate shapes of the Peltier element 33 that are described, curved shapes are also conceivable. It is also conceivable to accommodate a plurality of individual Peltier elements 33 in the intake pipe 4, these then projecting partially into the intake duct 11 of the intake pipe 4. The Peltier elements 33 projecting into the intake duct 11 of the intake pipe 4 can, for example, take the form of a flow guide with aerodynamic vane elements in order to heat the fuel jet 10 as far as possible over an extended area.

The foregoing relates to preferred exemplary embodiments of the invention, it being understood that other variants and embodiments thereof are possible within the spirit and scope of the invention, the latter being defined by the appended claims.

We claim:

1. A fuel injection device for an internal combustion engine that has an air intake pipe and at least one cylinder, which is provided with an inlet port, and into which at least one fuel injection valve sprays fuel in a direction of at least one inlet valve accommodated in a cylinder head of the internal combustion engine, the fuel leaving the fuel injection valve being directed at least in part at an electric heating element, wherein the electric heating element is in the form of a Peltier element (33) which is thermally and physically accommodated in and connected directly to an inner wall (20) of the inlet port of a cylinder head, and the Peltier element (33) is accommodated with a heatable upper surface (27) flush with an inner wall (20) of the inlet port (7) in the cylinder head (21).

2. A fuel injection device for an internal combustion engine that has an air intake pipe and at least one cylinder, which is provided with an inlet port, and into which at least one fuel injection valve sprays fuel in a direction of at least one inlet valve accommodated in a cylinder head of the internal combustion engine, the fuel leaving the fuel injection valve being directed at least in part at an electric heating element, wherein the electric heating element is in the form of a Peltier element (33) which is thermally and physically accommodated in a recess (37) in an inner wall of the cylinder head (21) or in the intake pipe (4), which recess is separated from the inlet port (7) or an intake duct (11) by a thin metal layer (39) of the cylinder head (21) or the intake pipe (4).

3. A fuel injection device for an internal combustion engine which has at least one cylinder, the latter being provided with an inlet port and being connected to an intake pipe into which a fuel injection valve dispenses fuel, the fuel leaving the fuel injection valve at least in part striking an electric heating element accommodated in the intake pipe, wherein the electric heating element is in the form of a Peltier element (33) which is thermally and physically accommodated in the intake pipe (4) and includes a heatable upper surface (27) flush with an inner wall (25) of the intake pipe (4).

4. A fuel injection device for an internal combustion engine that has an air intake pipe and at least one cylinder, which is provided with an inlet port, and into which at least one fuel injection valve sprays fuel in a direction of at least one inlet valve accommodated in a cylinder head of the internal combustion engine, the fuel leaving the fuel injection valve being directed at least in part at an electric heating element, wherein the electric heating element is in the form of a Peltier element (33) which is thermally and physically accommodated in a recess (37) in an inner wall (25) of the intake pipe (4), which recess is separated from the inlet port (7) or an intake duct (11) by a thin metal layer (39) of the intake pipe (4).

* * * * *